United States Patent [19]

Bagaglio et al.

[11] Patent Number: 4,801,736

[45] Date of Patent: Jan. 31, 1989

[54] POLYESTER POLYOLS CONTAINING MONOALKANOLAMINE DERIVED UNITS

[75] Inventors: Gian C. Bagaglio, Brussels; James M. Bentley, Wezembeek-Oppem; James P. Brown, Sterrebeek, all of Belgium

[73] Assignee: Imperial Chemical Industries PLC, London, England

[21] Appl. No.: 5,861

[22] Filed: Jan. 21, 1987

[30] Foreign Application Priority Data

Feb. 5, 1986 [GB] United Kingdom ............ 8602801

[51] Int. Cl.$^4$ ............................................ C07C 69/80
[52] U.S. Cl. .................................. 560/84; 252/182.11; 521/164; 560/88; 560/193; 560/196
[58] Field of Search ............... 560/84, 88, 193, 196; 521/164; 252/182

[56] References Cited

U.S. PATENT DOCUMENTS

| | | | |
|---|---|---|---|
| 3,948,847 | 4/1976 | Aitken et al. | 528/273 X |
| 4,123,422 | 10/1978 | Erikson et al. | 528/273 |
| 4,435,297 | 3/1984 | Forsberg | 560/196 X |

FOREIGN PATENT DOCUMENTS

| | | |
|---|---|---|
| 2253037 | 6/1975 | France. |
| 858757 | 1/1961 | United Kingdom. |
| 956947 | 4/1964 | United Kingdom. |

*Primary Examiner*—Werren B. Lone
*Assistant Examiner*—Vera C. Clarke
*Attorney, Agent, or Firm*—Cushman, Darby & Cushman

[57] ABSTRACT

The invention relates to a method for preparing microcellular polyurethane elastomer by reacting an organic isocyanate, a polyester polyol, a difunctional chain extender and a blowing agent, wherein at least a part of the polyester polyol used consists of a polyester polyol having a hydroxyl number between 28 and 112 and comprising units derived from aliphatic and/or aromatic dicarboxylic acids and from aliphatic, cycloaliphatic and/or heterocyclic glycols, as well as between 0.02 and 11 mole percent of units derived from monoalkanolamine with respect to the total amount of glycol and monoalkanolamine present in the polyester polyol.

6 Claims, No Drawings

POLYESTER POLYOLS CONTAINING MONOALKANOLAMINE DERIVED UNITS

This invention relates to new polyester polyols and to their use in microcellular polyurethane elastomers.

It is well known to manufacture microcellular polyurethane elastomers, especially for shoe-soling applications, by the interaction of a number of difunctional components. Thus, in one type of formulation, an organic diisocyanate, which may be in the form of a prepolymer, is reacted with a polyester diol and a low molecular weight diol such as 1,4-butanediol as chain extender, the reaction being performed in the presence of catalysts, surface active agents and a blowing agent, for example water.

It is appreciated by those skilled in the art that polyurethanes made from essentially difunctional components can, nevertheless, contain cross-links because of secondary reactions, for example the reaction of diisocyanates or isocyanate-terminated polymer chains with the urethane and urea groups formed in the primary reactions. The introduction of a higher cross-link density by the deliberate use of higher functionality components, for example branched polyesters, can at certain levels have a generally deleterious effect on elastomer properties, for example tear and tensile strengths and abrasion resistance. At a lower level, however, the introduction of higher functionality components into an otherwise difunctional system can have advantageous effects.

Thus United Kingdom Patent Specification No. 1478045 describes a process for the manufacture of moulded flexible cellular polyurethane articles, especially microcellular elastomers, from a reaction mixture in which at least one of the reactants has a functionality greater than two, the overall functionality being defined in terms of the additional degree of branching present in the final polyurethane. The higher functionality component can be a polyester polyol, a polyisocyanate or a non-polymeric cross-linking agent. Suitable polyesters are said to be obtained by including a branching component in the polyester-forming reaction mixture, the branching components mentioned being glycerol, trimethylolpropane, pentaerythritol and trimesic acid. The effect of the higher functionality component is to enable the elastomers to be removed from the moulds in a shorter time than is the case for elastomers made from wholly difunctional components. Additionally, the increased functionality generally improves the humid ageing resistance of the elastomer.

It has now been found that a significant improvement in the flex fatigue properties of the elastomers over a wide NCO/OH mixing ratio range can be achieved by the use of certain new polyester polyols containing amide (—CONH—) linkages.

The new polyester polyols according to the invention, comprising units derived from aliphatic and/or aromatic dicarboxylic acids or their ester forming derivatives and from aliphatic, cycloaliphatic and/or heterocyclic glycols, are characterised in that the polyester polyol comprises between 0.02 and 11.0 mole percent of units derived from monoalkanolamine, with respect to the total amount of glycol and monoalkanolamine present in the polyester polyol, and in that the polyester polyol has an hydroxyl number between 28 and 112.

The preferred polyester polyols in accordance with the invention are more particularly those comprising between 3 and 6 mole percent of units derived from monoalkanolamine with respect to the total amount of glycol and monoalkanolamine present in the polyester polyol.

The invention furthermore provides a method for preparing microcellular polyurethane elastomers by reacting an organic diisocyanate, a polyester polyol, a difunctional chain extender and a blowing agent, wherein at least part of the polyester polyol used has an hydroxyl number between 28 and 112 and comprises between 0.02 and 11 mole percent, preferably between 3 and 6 mole percent, of units derived from monoethanolamine with respect to the total amount of glycol and monoethanol amine present in the polyester polyol.

The organic diisocyanate is preferably an aromatic diisocyanate, for example 4,4'-diphenylmethane diisocyanate and its mixtures with the 2,4'-isomer. In making the elastomer, the diisocyanate, especially when solid at ambient temperatures, may be used in the form of a prepolymer obtained in known manner by reacting the diisocyanate with a stoichiometric deficiency of a polyester polyol or one or more low molecular weight diols.

The polyester polyol may be prepared in conventional manner by reacting one or more aliphatic and/or aromatic dicarboxylic acids, for example adipic, glutaric, succinic, phthalic, isophthalic and terephthalic acids, or their ester-forming derivatives, for example their dimethyl esters, with one or more aliphatic, cycloaliphatic or heterocyclic glycols, for example ethylene glycol, propylene glycol, diethylene glycol, 1,4-butanediol, 1,5-pentanediol, 1,6-hexanediol, 1,4-cyclohexanedimethanol and 2,5 bis-hydroxymethylfuran and with a mono-alkanolamine such as ethanolamine (2-aminoethanol). The melting point of the polyester should not exceed 50 deg. Celsius and the viscosity at 100 deg. Celsius should not exceed 10 poises.

The polyester diol containing —CONH— linkages may be the sole polyester in the formulation or, alternatively, it may be used in conjunction with a polyester diol containing no —CONH— linkages. Furthermore, as indicated above, a portion of polyester, which may or may not contain —CONH— linkages, may be pre-polymerised with the diisocyanate. The overall polyester hydroxyl number is preferably in the range 45-65.

Whilst the polyester diols containing —CONH— linkages are essentially unbranched in structure unlike, for example, polyesters containing trimethylolpropane or pentaerythritol residues, the presence of the —CONH— linkages introduces the possibility of cross-links being formed during reaction with the diisocyanate, the level of cross-linking being dependent upon the —CONH— content and the isocyanate index. It is preferred that the —CONH— content of the polyester and the isocyanate index should be such that the polyurethane product contains from 0.008 to 0.20 branch point per 1000 units of molecular weight additional to the branching present when wholly difunctional components are used.

The difunctional chain extender is suitably a low molecular weight aliphatic, cycloaliphatic or heterocyclic diol, for example ethylene glycol, 1,4-butanediol or a low molecular weight diamine.

Suitable blowing agents include water and inert volatile liquids such as trichlorofluoromethane, the amount being selected in known manner to provide an elastomer of the desired density.

In addition to the components already mentioned, the elastomer-forming reaction mixture may also contain other conventional ingredients of such systems. In particular, it may contain catalysts, for example tertiary amines and tin compounds, surfactants, for example siloxane-oxyalkylene copolymers and oxyethylated alkylphenols, flame-retardants, fillers and pigments.

The components of the reaction mixture may be mixed together in any convenient manner, for example by using any of the equipment described in the prior art for the purpose. If desired some of the individual components may be pre-blended so as to reduce the number of component streams requiring to be brought together in the final mixing step. It is often convenient to have a two-stream system whereby one stream comprises a prepolymer and the second stream comprises all the other components of the reaction mixture. In preferred formulations, one stream comprises a prepolymer of diphenylmethane diisocyanate and a polyester diol, the other stream comprising a polyester containing ethanolamine residues, 1,4-butanediol and/or ethylene glycol as chain extender, water as blowing agent together with catalyst and surfactant.

The method of the invention is particularly useful for the production of shoe soles. For that purpose, the reaction mixture may be introduced into moulds corresponding in size and shape with the desired products, the overall density being varied in known manner by varying the amount of blowing agent and the degree of overpacking. The microcelluar products may have densities in the range 0.3–1.0 g/cm$^3$.

A further useful feature of the polyester diols containing —CONH— linkages is that they yield polyurethanes having some of the advantageous prroperties associated with branched polyesters whilst retaining the lower viscosities associated with linear polyesters.

The invention is illustrated but not limited by the following Example in which all parts and percentages are by weight unless otherwise indicated.

EXAMPLES

1. Preparation of Polyesters

The following polyesters were prepared in a conventional manner by reacting the reactants in the molar quantities listed below, in the presence of tetrabutyl-o-titanate sufficient to give 6 ppm Ti in final product, and in a nitrogen atmosphere at temperatures up to 210 Deg. C.

TABLE 1

| moles REACTANT | polyester A | B | C | D | E | F | G |
| --- | --- | --- | --- | --- | --- | --- | --- |
| Adipic acid | 10.64 | 10.65 | 10.67 | 10.70 | 10.64 | 10.66 | 10.68 |
| Ethylene glycol | 7.76 | 7.56 | 7.39 | 7.02 | 7.46 | 7.46 | 7.32 |
| 1.4 butane diol | 3.88 | 3.78 | 3.70 | 3.51 | 3.73 | 3.73 | 3.66 |
| ethanolamine | — | 0.30 | 0.58 | 1.17 | — | 0.47 | 0.70 |
| trimethylol propane | — | — | — | — | 0.30 | — | — |
| Analysis | | | | | | | |
| Hydroxyl value | 55.6 | 58.1 | 57.0 | 56.6 | 55.3 | 57.3 | 56.2 |
| Acid value | 0.40 | 0.51 | 0.48 | 0.21 | 0.46 | 0.46 | 0.25 |
| Viscosity at 100 Deg. C. (centistokes) | 225 | 231 | 251 | 381 | 346 | 249 | 281 |

2. Preparation of Prepolymers

Prepolymer X having an NCO content of 18.52% was prepared by reacting 60.11 parts of 4,4'-diphenylmethane diisocyanate with 39.84 parts of Polyester A.

Prepolymer Y having an NCO content of 18.70% was prepared by reacting 59.21 parts of 4,4'-diphenylmethane diisocyanate and 1.50 parts of crude MDI (NCO content 29.2%) containing approximately 55% of diphenylmethane diisocyanate, the bulk of the remainder being polymethylene polyphenyl polyisocyanates of functionally greater than two with 39.29 parts of Polyester A.

3. Preparation of Elastomers from polyester A, B and E

Microcellular elastomers were prepared under conventional conditions from the formulations 1–9 described in Table II. Quantities are quoted in parts by weight. The formulations were designed to give elastomers having one theoretical branch point per 81,000 units of molecular weight (theoretical number of branch points based on polyol plus prepolymer). Physical properties of the elastomers obtained are given in Table II. Testing was carried out under uniform conditions.

The cream time, gel time, tack free time, tear resistance time, free rise density and moulding resilience were substantially comparable for all formulations.

TABLE II

| | Preparation of Elastomers Formulation | | | | | | | | |
| --- | --- | --- | --- | --- | --- | --- | --- | --- | --- |
| | 1 | 2 | 3 | 4 | 5 | 6 | 7 | 8 | 9 |
| Polyester A | 65.9 | 65.9 | 65.9 | 85.1 | 85.1 | 85.1 | 65.9 | 65.9 | 65.9 |
| Polyester B | 19.2 | 19.2 | 19.2 | | | | | | |
| Polyester E | | | | | | | 19.2 | 19.2 | 19.2 |
| 1,4-Butanediol | 13.5 | 13.5 | 13.5 | 13.5 | 13.5 | 13.5 | 13.5 | 13.5 | 13.5 |
| Water | 0.4 | 0.4 | 0.4 | 0.4 | 0.4 | 0.4 | 0.4 | 0.4 | 0.4 |
| DABCO | 0.5 | 0.5 | 0.5 | 0.5 | 0.5 | 0.5 | 0.5 | 0.5 | 0.5 |
| Silicone DC 190 | 0.5 | 0.5 | 0.5 | 0.5 | 0.5 | 0.5 | 0.5 | 0.5 | 0.5 |
| Prepolymer X | 94 | 96 | 98 | | | | 94 | 96 | 98 |
| Prepolymer Y | | | | 92 | 94 | 96 | | | |

TABLE III

| | | Physical Properties | | | | | | | | |
|---|---|---|---|---|---|---|---|---|---|---|
| | | Formulation | | | | | | | | |
| | | 1 | 2 | 3 | 4 | 5 | 6 | 7 | 8 | 9 |
| Test Sheet density | (kg/m3) | 580 | 580 | 580 | 600 | 600 | 600 | 610 | 618 | 605 |
| Hardness | (Sh · A) | 65 | 67 | 68 | 66 | 66 | 68 | 69 | 71 | 71 |
| Pirmasens Flex measurements* | | | | | | | | | | |
| Cut growth at 30 Kc | (%) | 0 | 5 | 10 | 35 | br. | **br. | 30 | br. | br. |
| Cycles at break | (Kc) | >30 | >30 | >30 | >30 | 25 | 20 | >30 | 28 | 16 |
| Max tan & temperature (degrees Celsius) | | | −20 | | | −16 | | | −15 | |

*according to the method DIN 53522.
**br. stands for: breaks.

4. Preparation of Elastomers from polyester A, B, C and D

Elastomers were prepared by hand mixing technique from the formulations 1–4 described in table IV. Prepolymer Z is a commercially available product having a NCO content of 19%, marketed by Imperical Chemical Industries Ltd. under the trade name "Uropol DP 980".

Quantities used in the formulations are quoted in parts by weight.

The cream time, gel time, tack free time, tear resistance time, free rise density and moulding resilience were substantially comparable for all formulations. The physical properties of the obtained elastomers are given in table V.

TABLE IV

| | Preparation of Elastomers | | | |
|---|---|---|---|---|
| | Formulation | | | |
| | 1 | 2 | 3 | 4 |
| Polyester A | 85.40 | — | — | — |
| Polyester B | — | 85.40 | — | — |
| Polyester C | — | — | 85.40 | — |
| Polyester D | — | — | — | 85.40 |
| 1.4 butane diol | 13.50 | 13.50 | 13.50 | 13.50 |
| Water | 0.40 | 0.40 | 0.40 | 0.40 |
| Dabco (Solid) | 0.40 | 0.40 | 0.40 | 0.40 |
| Silicone DC-193 | 0.30 | 0.30 | 0.30 | 0.30 |
| Total | 100 | 100 | 100 | 100 |

TABLE IV-continued

| | Preparation of Elastomers | | | |
|---|---|---|---|---|
| | Formulation | | | |
| | 1 | 2 | 3 | 4 |
| Prepolymer Z | 90 | 89 | 88 | 86 |

TABLE V

| | Physical properties | | | | |
|---|---|---|---|---|---|
| Physical Parameter | Units | Form. 1 | Form. 2 | Form. 3 | Form. 4 |
| Overall density | Kg/m$^3$ | 617 | 626 | 609 | 591 |
| Hardness | Deg · ShA | 70 | 68 | 66 | 63 |
| Pirmasens Flex measurements: | | | | | |
| cut growth at 30 kc. | % | Breaks | 170 | 10 | 700 |
| cycles/break kc. | | 25 | >30 | >30 | >30 |

5. Preparation of Elastomers from Polyesters A, F and G

Elastomers were prepared by machine mixing technique from the formulations 1–9 described in table VI. Quantities are quoted in parts by weight. Physical properties of the obtained elastomers are given in table VII.

The cream time, gel time, tack free time, tear resistance time, free rise density and moulding rsilience are substantially comparable for all formulations.

TABLE VI

| | Preparation of Elastomers | | | | | | | | |
|---|---|---|---|---|---|---|---|---|---|
| | Formulation | | | | | | | | |
| | 1 | 2 | 3 | 4 | 5 | 6 | 7 | 8 | 9 |
| Polyester A | 85.3 | 85.3 | 85.3 | — | — | — | — | — | — |
| Polyester F | — | — | — | 85.3 | 85.3 | 85.3 | — | — | — |
| Polyester G | — | — | — | — | — | — | 85.3 | 85.3 | 85.3 |
| 1.4 butane diol | 13.5 | 13.5 | 13.5 | 13.5 | 13.5 | 13.5 | 13.5 | 13.5 | 13.5 |
| DABCO (solid) | 0.5 | 0.5 | 0.5 | 0.5 | 0.5 | 0.5 | 0.5 | 0.5 | 0.5 |
| Silicone DC-193 | 0.3 | 0.3 | 0.3 | 0.3 | 0.3 | 0.3 | 0.3 | 0.3 | 0.3 |
| Water | 0.4 | 0.4 | 0.4 | 0.4 | 0.4 | 0.4 | 0.4 | 0.4 | 0.4 |
| total | 100 | 100 | 100 | 100 | 100 | 100 | 100 | 100 | 100 |
| Prepolymer Z | 90 | 92 | 94 | 91 | 93 | 94 | 91 | 92 | 94 |

TABLE VII

| | | Physical Properties | | | | | | | | |
|---|---|---|---|---|---|---|---|---|---|---|
| Physical parameter | Units | Formulation | | | | | | | | |
| | | 1 | 2 | 3 | 4 | 5 | 6 | 7 | 8 | 9 |
| Overall density | Kg/m$^3$ | 588 | 587 | 571 | 595 | 595 | 584 | 605 | 580 | 585 |
| Hardness | Deg · SnA | 65 | 66 | 66 | 64 | 66 | 66 | 62 | 63 | 63 |
| Abrasion (40 m/10 N)* | mg | 145 | 124 | 103 | 187 | 160 | 156 | 120 | 158 | 148 |
| Rossflex** measurements | | | | | | | | | | |

TABLE VII-continued

| Physical parameter | Units | Physical Properties Formulation | | | | | | | | |
|---|---|---|---|---|---|---|---|---|---|---|
| | | 1 | 2 | 3 | 4 | 5 | 6 | 7 | 8 | 9 |
| cut growth at 30 Ke | % | 900 | br. | br. | 1000 | br. | br. | 300 | br. | br. |
| cycles/break | keys | 40.5 | 20.0 | 13.0 | 38.0 | 25.0 | 23.0 | 43.0 | 22.0 | 16.5 |

*according to the method DIN 5356.
**according to the method ASTM D-1052/55.

We claim:

1. A polyester polyol comprising units derived from dicarboxylic acids selected from the group consisting of adipic, glutaric, succinic, phthalic, isophthalic and terephthalic acids and their ester-forming derivatives and glycols selected from the group consisting of ethylene glycol, propylene glycol, diethylene glycol, 1,4-butanediol, 1,5-pentanediol, 1,6-hexanediol, 1,4-cyclohexanedimethanol and 2,5-bis-hydroxymethylfuran, characterized in that the polyester polyol comprises between 0.02 and 11.0 mole percent of units derived from monoalkanolamine with respect to the total amount of glycol and monoalkanolamine present in the polyester polyol, and in that the polyester polyol has an hydroxyl number between 28 and 112.

2. A polyester polyol according to claim 1 characterized in that it comprises between 3 and 6 mole percent of units derived from monoalkanolamine.

3. A polyester polyol according to claim 1 or 2 characterized in that the monoalkanolamine is monoethanolamine.

4. A polyester polyol blend useful for the preparation of microcellular polyurethane elastomers, characterized in that it consists of a mixture of one or more polyester polyols comprising units derived from dicarboxylic acids selected from the group consisting of adipic, glutaric, succinic, phthalic, isophthalic and terephthalic acids, and glycols selected from the group consisting of ethylene glycol, propylene glycol, diethylene glycol, 1,4-butanediol, 1,5-pentanediol, 1,6-hexanediol, 1,4-cyclohexanedimethanol and 2,5-bis-hydroxymethylfuran, with at least one of said polyester glycols having a hydroxyl number between 28 and 112 and containing between 0.02 and 11.0 mole percent of monalkanolamine with respect to the total amount of glycol and monalkanolamine present in said polyester polyol.

5. A polyester polyol blend according to claim 4, characterized in that said polyester glycol comprises between 3 and 6 mole percent of units derived from monoalkanolamine.

6. A polyester polyol blend according to claim 4 or 5 characterized in that said polyester glycol comprises units derived from monoethanolamine.

* * * * *